Patented Apr. 27, 1937

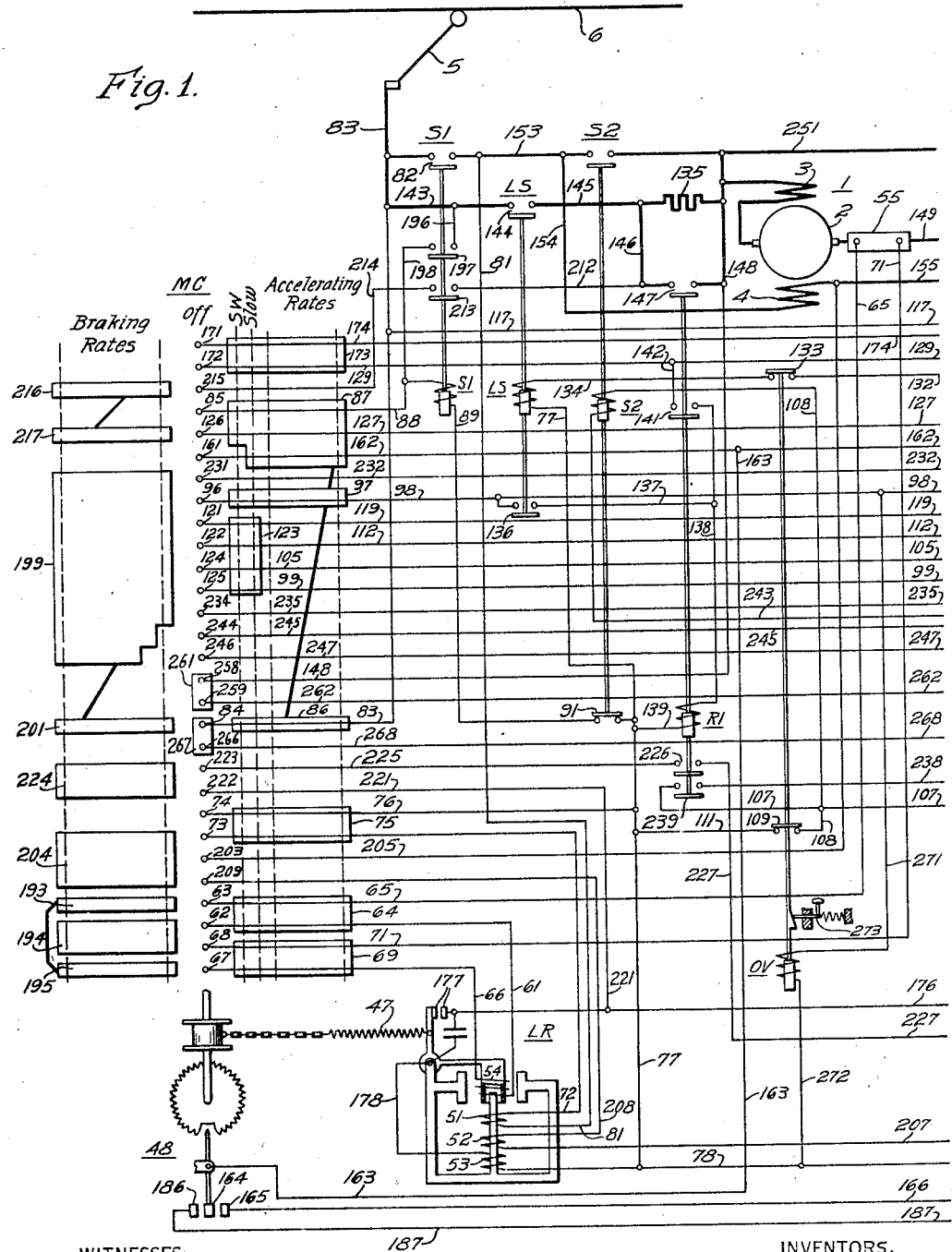

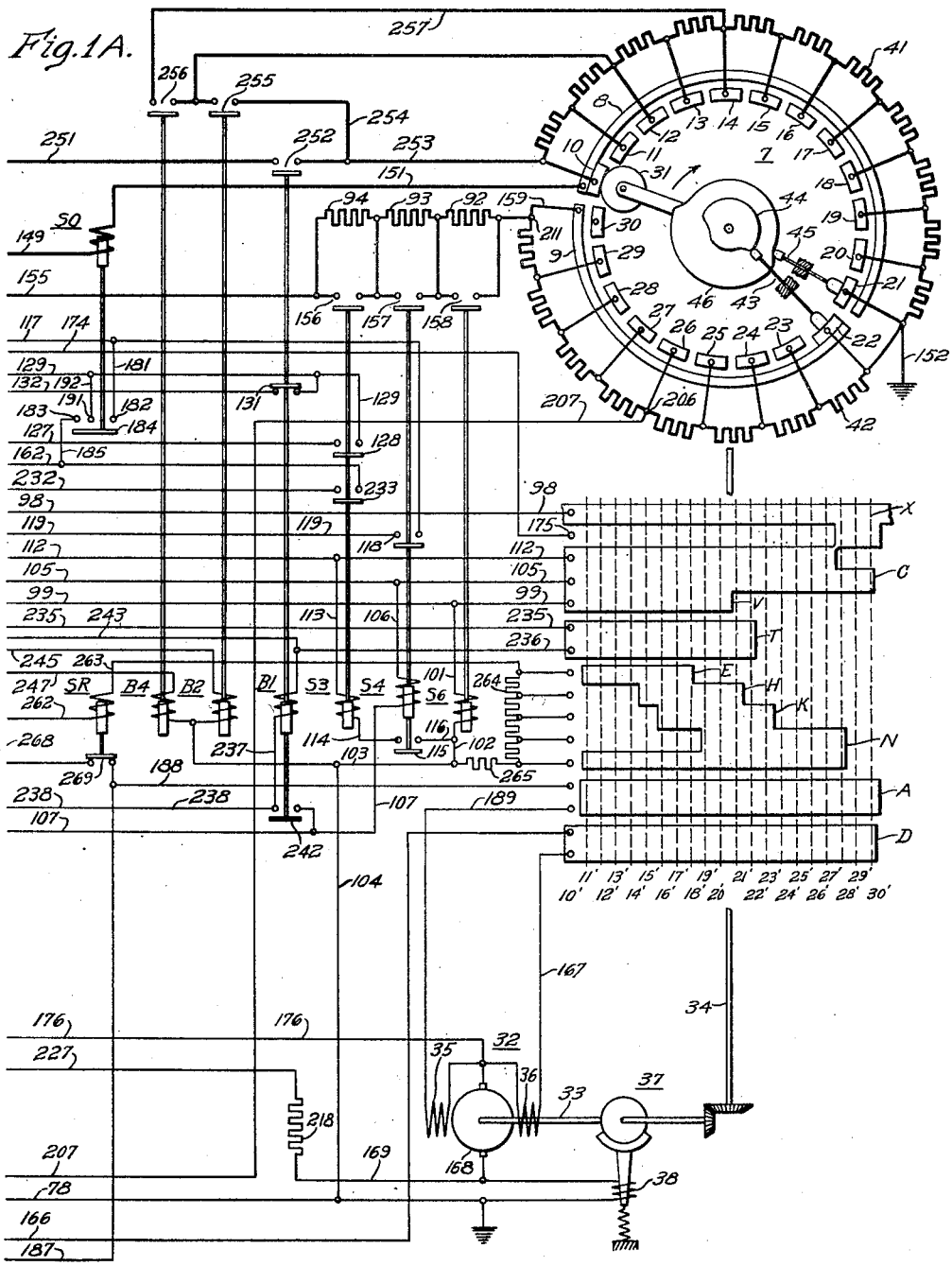

2,078,683

UNITED STATES PATENT OFFICE 2,078,683

MOTOR CONTROL SYSTEM

Lynn G. Riley, Pittsburgh, Norman H. Willby, Irwin, and Frank B. Powers, Wilkinsburg, Pa., assignors to Westinghouse Electric & Manufacturing Company, East Pittsburgh, Pa., a corporation of Pennsylvania Application September 26, 1935, Serial No. 42,186

18 Claims. (Cl. 172—179)

Our invention relates, generally, to motor control systems, and more particularly to systems for controlling the deceleration of electrically propelled vehicles by means of electrical braking.

In view of the utilization of resilient wheels on light traction vehicles, such as street cars, to secure quieter operation, it is necessary to provide some means of braking the vehicles other than by friction brakes on the wheel treads, as the high temperature, resulting from the transformation of the stored energy of the vehicle into heat at the wheel rims, is injurious to the resilient material provided in the wheels.

An object of the invention, generally stated, is to provide a system for automatically controlling both the acceleration and the deceleration of an electrically propelled vehicle which shall be simple and efficient in operation and which may be economically manufactured and installed.

A more specific object of the invention is to provide for decelerating an electrically propelled vehicle by both regenerative and dynamic braking.

Another object of the invention is to provide for automatically establishing regenerative and dynamic braking in sequential relation.

A further object of the invention is to provide for varying both the accelerating and the decelerating rate of an electrically propelled vehicle by the operator of the vehicle.

Still another object of the invention is to provide for the smooth deceleration of an electrically propelled vehicle in the event that the power is shut off by the operator of the vehicle while it is in operation.

A still further object of the invention is to prevent an excessive flow of current upon the reapplication of electrical power or brake while the vehicle is coasting.

Another object of the invention is to prevent the generated voltage from rising to a dangerous value in the event of power interruption during regeneration.

Other objects of the invention will be explained fully hereinafter or will be apparent to those skilled in the art.

According to one embodiment of the invention, both the acceleration and the deceleration of the propelling motor of an electric vehicle are controlled by an accelerator of the type described in Patent No. 1,991,229, issued February 12, 1935 to L. G. Riley and assigned to the Westinghouse Electric & Manufacturing Company. The accelerator comprises a circular copper bus divided into two sections inside of which are disposed a plurality of contact fingers which are progressively forced against the bus by a revolving roller driven by a pilot motor. The main contact fingers in one section of the accelerator are connected to a resistor which is in series with the motor armature and the fingers in the other section are connected to a resistor for controlling the current in the shunt field winding of the motor, which is a compound motor having a series field winding and a shunt field winding.

During a typical cycle of operation, the motor driven roller passes over the main contact fingers to cut resistance out of the armature circuit to accelerate the propelling motor. It then passes over the field fingers, decreasing the shunt field current and continuing the acceleration to produce maximum speed of the motor. The regenerative braking cycle is just the reverse. The roller first passes over the field fingers, increasing the shunt field current and causing regenerated current to flow through the motor armatures. When the maximum shunt field strength has been reached, determined by the position of the roller, the motor is automatically connected for dynamic braking and the roller continues over the main fingers cutting resistance out of the armature circuit during dynamic braking.

For a fuller understanding of the nature and objects of the invention, reference may be had to the following detailed description, taken in conjunction with the accompanying drawings, in which Figures 1 and 1A, taken together, constitute a diagrammatic view of a control system embodying the invention.

Referring to the drawings, a motor 1 may be utilized for propelling a vehicle (not shown). The motor 1 is of the compound type, having an armature winding 2, a series field winding 3 and a shunt field winding 4. An electrically operated line switch LS is provided for connecting the motor to a trolley 5. The trolley 5 engages a power conductor 6 which may be connected to any suitable source of power, such as a generating station (not shown).

Both the acceleration and the deceleration of the vehicle are primarily controlled by a motor-driven accelerator 7 which is of the same general type as the one disclosed in the aforementioned Patent No. 1,991,229. The accelerator 7 comprises a circular copper bus divided into two insulated sections 8 and 9, inside of which are disposed a plurality of contact fingers 10 to 30, inclusive, which are progressively forced against the bus by a revolving roller 31.

The roller 31 is driven by a pilot motor 32 through shafts 33 and 34. The pilot motor 32 is provided with two field windings 35 and 36, one for each direction of rotation. A brake 37 is provided for stopping the motor, a brake release coil 38 being connected in series with the pilot motor and deenergized when the motor is deenergized.

The accelerator 7 is provided with two resistors 41 and 42, each resistor being divided into a number of subdivisions which are connected to the contact fingers of the accelerator. The resistor 41 is connected to the contact fingers 10 to 21, inclusive, and the resistor 42 is connected to contact fingers 22 to 30, inclusive. The resistor 41 is connected in the armature circuit of the motor 1 and is utilized to control the armature current. The resistor 42 is utilized to control the current in the shunt field winding 4 of the motor during acceleration and regenerative braking, as will be more fully described hereinafter.

It will be observed that contact finger 22 is depressed by a push rod 43, actuated by a cam 44, and that the contact finger will be held against the bus bar 9 until the roller 31 reaches this finger. Likewise, contact finger 21 will be held against the bus bar 8 by a push rod 45, actuated by a cam 46, after the roller 31 passes over the finger 21 in order that the motor circuit will not be interrupted.

As shown, a number of cam switches A, C, D, E, H, K, N, T, V, and X are located in the accelerator 7 and are actuated by the shaft 34. The reference numerals 10' to 30', inclusive, indicate the contact fingers over which the roller 31 travels while the cam switches are closed. The function of the various cam switches will be explained as the description of the control system proceeds.

In addition to the accelerator and its associated cam switches, several other switches are provided to perform all main switching operations not taken care of by the accelerator. These switches include a resistor-shunting switch R1, which is interlocked to close after the line switch LS closes, thereby limiting the current flow when LS closes; switches S1 and S2 for establishing the shunt field connections; S3, S4, and S6 which cooperate with the accelerator in controlling the shunt field current; a switch B1 for establishing dynamic braking connections for the motor 1; and switches B2 and B4 which shunt a portion of the accelerator resistor 41 to provide two rates of dynamic braking.

A master controller MC is provided for controlling the motor connections both during acceleration and braking. As shown, the controller is of the drum type, having a central "off" position with accelerating positions on one side and braking positions on the other. On the accelerating side there are a switching position, a slow-speed running position and a certain amount of travel for various rates of acceleration. The variable accelerating rates are obtained by mechanically increasing the tension on a spring 47 on a limit relay LR as the controller handle is advanced. A reversing switch 48, located at the bottom of the controller, automatically reverses the accelerator pilot motor as the change is made from acceleration to braking, and vice versa. The braking side of the controller provides a certain amount of travel for various braking rates, accomplished in the same manner as during acceleration.

The function of the limit relay LR is to control the speed of the pilot motor 32 to maintain the desired rates of acceleration and deceleration. The relay is provided with three coils 51, 52, and 53, mounted on the stationary element, and a coil 54 on the moving element of the relay. During acceleration, the coil 51 is connected across the trolley voltage and the moving coil 54 is connected across a shunt 55 in the motor armature circuit. Relay operation checks the speed of the pilot motor when the desired armature current is reached. During regenerative braking, the stationary coil 51 is connected across the motor shunt field 4 and measures the shunt field current. The moving coil again measures armature current. The resultant operation maintains constant braking tractive effort by checking the pilot motor speed, as during acceleration.

The coil 52 on the limit relay is so connected during braking only that the flux established by this coil adds to the flux established by the coil 51, thereby causing the relay to limit the regenerated current at high speeds to a value which the motor can commutate. A voltage equal to the drop of the shunt field current through a portion of the accelerator resistor 42 is applied to the coil 52. The additional flux in the relay produced by this coil causes operation of the relay at a lower value of armature current. As the accelerator roller progresses back across the field contact fingers approaching the finger 26 to which the coil 52 is connected, the voltage of the coil is decreased, allowing increasing values of armature current. As the roller passes over finger 26, the coil 52 is short-circuited and the limit relay functions in its normal manner during the remainder of the regenerative braking cycle. The coil 53 is energized when the contact members of the relay are closed, which causes the relay to pump or vibrate over a wide range in setting, thus slowing down the accelerator roller before its progression is stopped by the limit relay. As previously stated, the setting of the limit relay may be varied at the will of the operator to control both the acceleration and the regenerative braking rates by operating the controller handle to vary the tension on the spring 47.

In order to prevent a heavy rush of current upon the re-application of power or electrical braking after coasting, a spotting relay SR is provided to change the position of the accelerator roller during coasting to approximately match the car speed. The relay coil is energized during coasting by the main motor voltage produced by a small shunt field excitation, which voltage is proportional to the car speed. As the speed decreases, the contact members of the relay are closed, causing the accelerator roller to be returned toward the first contact finger until a cam switch cuts some resistance out of the relay coil circuit. The contact members of the relay are then opened, holding the accelerator until the car speed has been further reduced, when another backward movement of the accelerator is caused by the closing of the relay contacts. This operation continues until the master controller is moved out of the coasting position, or until the accelerator is returned to the first position.

With a view to insuring a smooth shut-off of power at all speeds, an easy shut-off relay SO is provided. The relay coil is connected in series with the motor armature 2 and the relay functions to hold the line switch LS closed until the motor current has dropped to a moderate value during shut-off. When the master controller is returned to the "off" position, the pilot motor 32 is reversed by the reversing switch 48 and the accelerator is returned toward the first position. The backing of the accelerator reduces the motor current, which in turn permits the contact members of the easy shut-off relay SO to open, causing the line switch to open.

An overvoltage relay OV is provided for preventing the generated voltage from rising to a dangerous value in case of power interruption during regeneration. The relay operating coil is connected to measure the voltage of the motor 1 during regeneration and relay operation opens the line switch LS, opens the braking switch B1 if it is closed or prevents it from being closed to prevent dynamic braking, opens or prevents the switch S2 from closing and opens switch S4 to decrease the motor shunt field strength. The opening of the line switch LS removes voltage from the control apparatus and stops further progression of the accelerator roller. As shown, the overvoltage relay is of a latch type and must be reset by disengaging the latch.

In order to synchronize to the line at various speeds during regeneration, the motor generated voltage is applied to the operating coil of the line switch. When the generated voltage is approximately equal to the line voltage, which is the normal operating voltage of the line switch coil, the line switch is closed and regeneration results. Regeneration is prevented by an interlock on the switch S1 unless preceded by motoring or coasting and dynamic braking is prevented by an interlock on the switch R1 unless preceded by regeneration during which R1 is closed.

In order that the functioning of the foregoing apparatus may be more clearly understood, the operation of the system will now be described. Assuming that the master controller MC is moved to the switching position, circuits are established for operating the motor 1 with all of the external resistance connected in series with the motor, thereby causing the vehicle to move at the slowest rate.

Referring to the drawings, it will be seen that the following circuits are established when the master controller is moved to the switching position. One terminal of the coil 54 of the limit relay LR is connected to one terminal of the shunt 55 through conductor 61, contact fingers 62 and 63 bridged by contact segment 64 of the master controller, and conductor 65 to one terminal of the shunt 55. The other terminal of the coil 54 is connected to the shunt through conductor 66, contact fingers 67, and 68, bridged by contact segment 69, and conductor 71 to the other terminal of the shunt 55. The coil 54 is, therefore, connected to measure the armature current of the motor 1 when the current is flowing in the motoring direction.

At this time, one terminal of the coil 51 on the limit relay LR is connected to ground through conductor 72, contact fingers 73 and 74, bridged by contact segment 75, and conductors 76 and 77 to a grounded conductor 78. The other terminal of the coil 51 will be connected to the trolley 5 after the switch S1 is closed, the circuit extending through conductor 81, contact members 82 of the switch S1 and conductor 83 to the trolley 5.

The actuating coil of switch S1 is energized at this time to close the switch S1, thereby energizing the shunt field winding 4 of the motor 1.

The energizing circuit for the actuating coil of the switch S1 may be traced from conductor 83, which is connected to trolley 5, through contact fingers 84 and 85 which engage contact segments 86 and 87, respectively, of the controller MC, conductor 88, the actuating coil of the switch S1, conductor 89, an interlock 91 on the switch S2, and conductor 77 to the grounded conductor 78.

The switches S6, S4, and S3 are all closed at this time to shunt the resistors 92, 93 and 94, respectively, from the field winding circuit. The energizing circuit of the actuating coil of the switch S6 may be traced from a contact finger 96, which engages contact segment 97 of the controller MC, conductor 98, the cam switch V on the accelerator 7, conductors 99 and 101, the actuating coil of the switch S6 and conductors 102, 103 and 104 to the grounded conductor 78. The energizing circuit of the actuating coil of the switch S4 extends from the cam switch C, which is closed at this time and energized by the conductor 98, through conductors 105 and 106, the actuating coil of the switch S4, conductors 107 and 108, contact members 109 on the relay OV and conductors 111 and 77 to the grounded conductor 78. The energizing circuit for the actuating coil of the switch S3 may be traced from the cam switch X through conductors 112 and 113, the coil of the switch S3, conductor 114, an interlock 115 on the switch S4, and conductors 116, 102, 103 and 104 to the grounded conductor 78.

It will be noted that holding circuits are established for the switches S3, S4, and S6 when the master controller is in the switching and the slow speed running positions, thereby preventing these switches from being opened while the controller MC is in these positions. The holding circuit for the switch S3 may be traced from conductor 83 through conductor 117, an interlock 118 on the switch S4, conductor 119, contact fingers 121 and 122, bridged by contact segment 123 of the controller MC, conductors 112 and 113, thence through the actuating coil of the switch S3 and the circuit previously traced to the grounded conductor 78. The holding circuit for the switch S4 extends from contact finger 124, which engages the contact segment 123, through conductors 105 and 106 to the actuating coil of the switch S4 and thence to ground through the circuit previously traced. The holding circuit for the switch S6 may be traced from a contact finger 125, which also engages the contact segment 123, and conductors 99 and 101 to the actuating coil of the switch S6 and thence to ground through the circuit previously traced.

Following the closing of the switch S3, the line switch LS is closed to connect the armature of the motor 1 to the power conductor 83. The energizing circuit for the actuating coil of the switch LS may be traced from a contact finger 126, which engages the contact segment 87 energized by the conductor 83, through conductor 127, an interlock 128 on the switch S3, conductor 129, an interlock 131 on the switch B1, conductor 132, contact members 133 on the relay OV, conductor 134, the actuating coil of the limit switch LS and conductor 77 to the grounded conductor 78.

The switch R1 is closed after the closing of the limit switch LS, thereby shunting a resistor 135 from the motor circuit. In this manner, the amount of current permitted to flow through the motor circuit upon the closing of the switch LS is limited by the resistor 135, which is not shunted from the motor circuit until after the switch LS is closed. The energizing circuit for the actuating coil of the switch R1 may be traced from the previously energized conductor 98 through an interlock 136 on the switch LS, conductors 137 and 138, the actuating coil of the switch R1 and conductors 139 and 77 to the grounded conductor 78. The closing of the switch R1 also establishes a holding circuit for the switch LS through a circuit which may be traced from the previously energized conductor 138 through an interlock 141 of the switch R1, conductors 142 and 129, the interlock 131 on the switch B1, conductor 132, contact member 133 on the relay OV, conductor 134, the actuating coil of the switch LS and conductor 77 to the grounded conductor 78.

The motor 1 is now connected to the power source in series with the resistance in the accelerator 7. The circuit through the armature winding of the motor may be traced from the trolley 5 through conductors 83 and 143, contact members 144 of the switch LS, conductors 145 and 146, contact members 147 of the switch R1, conductor 148, the series field winding 3 of the motor 1, the armature winding 2, the shunt 55, conductor 149, the actuating coil of the easy shut-off relay SO, conductor 151, the contact finger 10 which engages the bus bar 8 of the accelerator 7 and resistor 41 to ground at 152.

The shunt field winding 4 of the motor 1 is energized through a circuit which may be traced from the power conductor 83 through contact member 82 of the switch S1, conductors 153 and 154, the shunt field winding 4, conductor 155, the contact members 156, 157, and 158 of the switches S3, S4, and S6, respectively, conductor 159, the bus bar 9 of the accelerator 7, contact finger 22 which is held against the bus bar 9 by the push rod 43 and thence to ground at 152.

As explained hereinbefore, the accelerator 7 is not operated to shunt resistance from the armature circuit of the motor 1 when the master controller MC is in the switching position. If it is desired to accelerate the motor 1, at a slow rate, the master controller is moved to the slow running position, thereby energizing the pilot motor 32 to operate the accelerator 7.

When the controller MC is actuated to the slow running position, in addition to the foregoing circuits, a circuit is established for energizing the pilot motor 32. This circuit may be traced from contact finger 161, which engages the previously energized contact segment 87, conductors 162 and 163, contact members 164 and 165 of the reversing switch 48, conductor 166, the cam switch D on the accelerator 7, conductor 167, the field winding 36 and the armature winding 168 of the pilot motor 32, conductor 169 the release coil 38 of the brake 37 and thence to the grounded conductor 78.

The roller 31 of the accelerator 7 is operated by the pilot motor 32 under control of the limit relay LR at the minimum accelerating rate, and the resistor 41 is shunted from the armature circuit of the motor 1. As the roller 31 progresses across the field contact fingers 22 to 30, inclusive, of the accelerator 7, the resistor 42 is connected in the shunt field winding circuit of the motor 1, thereby decreasing the field strength which increases the speed of the motor, in a manner well known in the art. However, as previously described, the switches S3, S4 and S6 are not opened to insert resistors 92, 93 and 94 in the field winding circuit to further decrease the field strength of the motor 1 while the master controller MC is in the slow running position.

It will be observed that contact fingers 171 and 172 are bridged by contact segment 173 when the master controller is in any one of the accelerating positions. Furthermore, conductor 174, which is connected to the contact finger 171, will be energized through contact member 175, which engages the cam switch X after the accelerator roller 31 has passed the contact finger 27. In this manner, the conductor 129 will be energized to permit the reapplication of power to the motor 1 by reclosing the line switch LS after the roller 31 has passed the finger 27 of the accelerator.

As described hereinbefore, the pilot motor 32 operates the accelerator 7 to accelerate the motor 1 under the control of the limit relay LR, the rate of acceleration being governed by the tension of the spring 47, which in turn is controlled by the operator of the vehicle by means of the master controller MC. By advancing the controller handle to the last position of the controller, the maximum rate of acceleration may be attained. No electrical circuits are changed to secure higher rates of acceleration.

When the contact members of the limit relay are closed by the increase in the motor current resulting from a decrease of the resistance in the motor circuit, the armature winding 168 of the motor 32 and the brake coil 38 are shunted by the contact members, thereby stopping progression of the roller. The shunt circuit may be traced from one terminal of the armature 168 of the motor 32 through conductor 176, the contact members 177 of the limit relay LR, conductor 178, and the tickler coil 53 of the limit relay to the grounded conductor 78.

As previously explained, the maximum speed of the motor 1 may be obtained by decreasing the shunt field strength. This is accomplished by inserting resistance in the shunt field winding circuit by means of the accelerator 7. In order to still further increase the speed of the motor, the switch S6 is opened by the opening of the cam switch V when the accelerator roller passes finger 21, which inserts the resistor 92 in the field winding circuit to decrease the field current. As the roller passes the finger 27, the cam switch X is opened to deenergize the switch S3, thereby inserting the resistor 94 in the shunt field circuit, and when the roller reaches the finger 30, the cam switch C is opened to open the switch S4 which still further decreases the shunt field current by inserting the resistor 93 in the field winding circuit. The holding circuits for the switches S3, S4, and S6, previously described, are interrupted when the controller MC is moved past the slow running position, thereby causing the contact fingers 121, 122, 124, and 125 to pass off the segment 123. The progression of the roller 31 is stopped as it passes the finger 30 by the opening of the cam switch D which deenergizes the pilot motor 32 and permits the brake 37 to be applied to stop the roller.

If the master controller MC is moved to the "off" position, thereby actuating the reversing switch 28, which is incorporated in the controller, the easy shut-off relay SO is held closed so long as the motor current is above a predetermined value. In this manner, a circuit is established which energizes the pilot motor 32 in the reverse direction to operate the roller 31 to insert the resistor 41 in the motor circuit, thereby decreasing the motor current.

Furthermore, the line switch LS is held closed until the motor current has been reduced to a value which will permit the easy shut-off relay to open. The energizing circuit for the pilot motor established by the easy shut-off relay may be traced from the previously energized conductor 117 through conductor 181, contact members 182 and 183, bridged by the segment 184 of the relay SO, conductors 185, 162, and 163, contact members 164 and 186 of the reversing switch 48, conductors 187 and 188, a cam switch A on the accelerator, conductor 189, the reverse field winding 35 of the pilot motor 32, the armature winding 168, conductor 169 and the brake coil 38 to the grounded conductor 78. The holding circuit for the line switch LS extends from a contact member 191 on the relay SO through conductor 192 to the conductor 129 and thence through the actuating coil of the line switch LS through the circuit previously traced. In this manner, an easy shut-off of the power at all times is insured.

If the master controller MC is moved to the braking positions, the accelerator 7 is operated to increase the shunt field strength of the motor 1 by decreasing the resistance in the field winding circuit to cause the motor 1 to regenerate current, thereby producing regeneration. As previously described, the operation of the accelerator is under the control of the limit relay in the same manner as during acceleration, and the rate of regenerative braking is controlled by operating the controller MC to vary the tension on the spring 47 which is connected to the limit relay. Regenerative braking is maintained until the vehicle's speed is reduced to a point at which the maximum excitation on the shunt field winding will no longer produce sufficient voltage in the motor 1 to regenerate current, at which time dynamic braking is automatically established, thereby further reducing the speed of the vehicle, which makes it necessary to use air brakes only at the end of the braking cycle to bring the vehicle to a complete stop.

When the controller MC is actuated to any one of the braking positions, the connections to the moving coil 54 on the limit relay LR are reversed in order to measure the motor current during braking, which is flowing in the reverse direction from that during acceleration. The reversing of the connections of the winding 54 is taken care of by the contact segments 193, 194, and 195 on the master controller MC.

Also the one terminal of the coil 51 of the limit relay LR is connected to the opposite terminal of the field winding 4 from that to which the other terminal of the winding 51 is connected, thereby connecting the coil 51 across the field winding 4 to measure the shunt field current during braking. The circuit through the coil 51 may be traced from one terminal of the field winding 4 through conductors 154, 153, and 81, the coil 51, conductor 72, contact fingers 73 and 203, bridged by contact segment 204, and conductor 205 to the other terminal of the field winding 4.

As previously described, the booster coil 52 of the limit relay LR is connected across a portion of the resistor 42 on the accelerator 7 during a part of the braking cycle. The circuit through the coil 52 may be traced from a terminal 206 on the resistor 42 through conductor 207, the coil 52, conductor 208, contact fingers 209 and 203 bridged by the contact segment 204, conductors 205, 155 and the contact members 156, 157, and 158 of the switches S3, S4, and S6, respectively, to a terminal 211 of the resistor 42. In this manner, the booster coil 52 measures the voltage-drop across a portion of the resistor during a part of the braking cycle, and the coil 52 functions to cause limit relay LR to operate at a lower current, thereby reducing the motor current at the higher speeds to a value which the motor can safely commutate.

As described hereinbefore, the switch S1 is held in the closed position both during coasting and regenerative braking, thereby energizing the shunt field winding of the motor 1. The holding circuit for the actuating coil of the switch S1 may be traced from the power conductor 83 through conductors 143 and 196, an interlock 197 on the switch S1, conductor 198, the actuating coil of the switch S1 and thence to ground through the circuit previously traced.

The switches S3, S4, and S6 are closed during regeneration, the contact fingers 122, 124, and 125 of the master controller being engaged by a contact segment 199 which is energized from the power conductor 83 through a contact segment 201. Therefore, the resistors 92, 93 and 94 are shunted from the energizing circuit for the field winding 4 both during regeneration and dynamic braking.

When the motor voltage is approximately equal to the trolley voltage, the line switch LS is closed to connect the armature 2 of the motor to the trolley, thereby permitting regeneration to take place as the motor voltage is increased. The energizing circuit for the actuating coil of the line switch LS may be traced from one terminal of the series field winding 3 through resistor 135, conductors 146 and 212, an interlock 213 on the switch S1, conductor 214, contact fingers 215 and 126, bridged by contact segments 216 and 217, to conductor 127 and thence through a circuit previously traced for the actuating coil of the line switch LS.

In this manner, synchronization to the line is obtained for regeneration and, furthermore, regeneration is prevented unless preceded by either motoring or coasting during which the switch S1 is closed, thereby establishing the circuit for the actuating coil of the line switch LS which has just been traced. Following the closing of the line switch LS, the switch R1 is closed to shunt the resistor 135 from the motor circuit in the manner hereinbefore described.

In view of the fact that a given change in shunt field current during regeneration has a much greater effect on armature current than the same change in field current during motoring, the accelerator roller is operated at a slower speed over the field fingers of the accelerator during regeneration than during motoring. The slower speed operation of the pilot motor is obtained by connecting a resistor 218 in parallel with the armature of the pilot motor. The parallel circuit through the resistor 218 may be traced from one terminal of the armature 168 of the pilot motor 32 through conductors 176 and 221, contact fingers 222 and 223 bridged by a contact segment 224, conductor 225, an interlock 226 on the switch R1, conductor 227, the resistor 218 and conductor 169 to the other terminal of the armature 168.

As described hereinbefore, the roller 31 of the accelerator 7 is operated in the reverse direction during regeneration from that during acceleration. In this manner, the resistor 42 is shunted from the field winding circuit to increase the field strength of the motor, thereby producing regeneration. The energizing circuit for the pilot motor 32 may be traced from a contact finger 231, which engages the previously energized segment 199, conductor 232, an interlock 233 on the switch S3, conductors 162 and 163, the contact members 164 and 186 of the reversing switch 48, conductors 187 and 188, the cam switch A, conductor 189, the reverse field winding 35, the armature 168 of the motor 32, conductor 169 and the brake coil 38 to the grounded conductor 78.

When the roller 31 reaches the contact finger 22, dynamic braking is automatically established by the closing of the switches B1 and S2 and the opening of the switches S1 and LS. The energizing circuit for the actuating coil of the switch B1 may be traced from a contact finger 234, which engages the contact segment 199, through conductor 235, the cam switch T, conductor 236, the actuating coil of the switch B1, conductors 237 and 238, an interlock 239 on the switch R1, which is closed, conductors 107 and 108, the contact members 109 on the relay OV and conductors 111 and 77 to the grounded conductor 78. A holding circuit is established for the switch B1 through an interlock 242 on the switch B1.

The energizing circuit for the actuating coil of the switch S2 may be traced from the previously energized conductor 236 through conductor 243, the actuating coil of the switch S2, conductor 108, the contact member 109 on the relay OV and conductors 111 and 77 to the grounded conductor 78.

As described hereinbefore, different rates of dynamic braking may be obtained by closing either one or both of the switches B2 and B4 to shunt a portion of the accelerator resistor 41 from the motor circuit independently of the action of the accelerator roller 31. If both switches are closed, the highest rate of dynamic braking is obtained. The closing of the switches B2 and B4 is governed by the position of the controller MC. The energizing circuit for the switch B2 may be traced from contact finger 244, which engages the contact segment 199, through conductor 245, the actuating coil of the switch B2 and conductors 103 and 104 to the grounded conductor 78. The energizing circuit for the switch B4 may be traced from a contact finger 246, which engages the contact segment 199, through conductor 247, the actuating coil of the switch B4 and conductors 103 and 104 to the grounded conductor 78.

As previously stated, the closing of the switches B1 and S2 establish dynamic braking connections for the motor 1. The circuit through the armature winding 2 of the motor may be traced from the one terminal of the armature through the series field winding 3, conductor 251, contact members 252 on the switch B1, conductors 253 and 254, contact members 255 and 256 of the switches B2 and B4, respectively, assuming both switches are closed, conductor 257, the resistor 41 of the accelerator 7, contact finger 21, which is held against the bus bar 8 of the accelerator by the push rod 45, the bus 8, conductor 151, the actuating coil of the shut-off relay SO, conductor 149 and the shunt 55 to the other terminal of the armature 2 of the motor. The circuit through the shunt field winding extends from conductor 251 through switch S2, conductor 154, the shunt field winding 4, conductor 155, contact members 156, 157 and 158 of the switches S3, S4 and S6, respectively, conductor 159, the bus bar 9, contact fingers 22 and 21, the bus bar 8 and thence through the circuit just previously traced to the armature winding 2 of the motor. It will be understood that the resistor 41 is shunted from the motor circuit by the roller 31 as it is returned towards the first position, thereby governing the dynamic braking action of the motor 1.

As explained hereinbefore, the switch S1 is held closed in the event that the master controller is moved to the off position to permit coasting of the vehicle, the switch S1 being held closed unless the switch S2 is closed to establish dynamic braking. The circuit through the switch S1 prevents opening of the motor shunt field under normal conditions and maintains a predetermined current through the motor shunt field during coasting. This predetermined shunt field excitation during coasting produces a motor armature voltage which is directly proportional to its speed. The armature voltage is applied to the operating coil of the spotting relay SR through a series resistance determined by the accelerator position. The circuit through the actuating coil of the spotting relay may be traced from the terminal of the series field winding of the motor 1 through conductor 148, contact fingers 258 and 259 bridged by a segment 261, conductor 262, the actuating coil of the relay SR, conductor 263, resistors 264 and 265 and conductors 103 and 104 to the grounded conductor 78.

As the armature speed decreases, the voltage drops, and the contact members of the spotting relay are closed to energize the pilot motor 32 to return the accelerator roller 31 toward the first position. The circuit for the pilot motor may be traced from the power conductor 83 through contact fingers 84 and 266 bridged by segment 267, conductor 268, contact members 269 of the relay SR, conductor 188 and thence to the pilot motor through a circuit previously traced. As the accelerator is returned towards the first position, the cam switches N, K, H, and E are closed in sequential relation to cut the resistor 264 out of the circuit for the actuating coil of the relay SR step-by-step. The accelerator roller is thereby returned toward the first position and in this manner the position of the roller is always approximately correct for the speed of the main motor 1, so that either braking or motoring may be obtained without a rush of armature current in either direction when the line switch is closed.

In the event of a trolley failure or power interruption during regeneration, the generated voltage rises above the trolley voltage. The actuating coil of the over-voltage relay OV is connected between one terminal of the motor 1 and ground during regeneration and measures the regenerated voltage. The energizing circuit for the actuating coil of the relay OV may be traced from the series field winding 3 through conductor 148, contact members 147 of the switch R1, conductors 146 and 145, contact members 144 of the switch LS, conductors 143 and 83, contact fingers 84 and 96, bridged by contact segments 201 and 199, conductors 98 and 271, the actuating coil of the relay OV, and conductor 272 to the grounded conductor 78.

As described hereinbefore, operation of the relay OV opens the line switch LS, opens the switch B1, if it is closed or prevents it from closing, opens or prevents the switch S2 from closing and opens the switch S4. The opening of the switch LS removes voltage from the control system and stops further progression of the roller 31. The relay OV must be reset by releasing a latch 273. In this manner the regenerated voltage is prevented from rising to a dangerous value.

From the foregoing description, it is apparent that we have provided a motor control system which will automatically control both the acceleration and the deceleration of an electrically propelled vehicle and will insure the smooth operation of the vehicle at all times.

Since numerous changes may be made in the above-described construction, and different embodiments of the invention may be made without departing from the spirit and scope thereof, it is intended that all matter contained in the foregoing description or shown in the accompanying drawings shall be interpreted as illustrative and not in a limiting sense.

We claim as our invention:

1. In a control system, in combination, a motor having an armature winding, a series field winding and a shunt field winding, a source of power for the motor, a resistor for controlling the motor armature current, a resistor for controlling the shunt field current, and means for successively varying said resistors to accelerate the motor and to produce regeneration and dynamic braking in sequential relation.

2. In a control system, in combination, a motor having an armature winding, a series field winding and a shunt field winding, a source of power for the motor, a variable resistor for controlling the motor armature current, a variable resistor for controlling the shunt field current, and common means for successively decreasing and increasing said resistors to accelerate the motor and for decreasing said resistors to produce regeneration and dynamic braking in sequential relation.

3. In a control system, in combination, a motor having an armature winding, a series field winding and a shunt field winding, a source of power for the motor, a variable resistor for controlling the motor armature current, a variable resistor for controlling the shunt field current, common means for successively decreasing and increasing said resistors to accelerate the motor and for decreasing said resistors to produce regeneration and dynamic braking in sequential relation, and means responsive to the motor armature current for controlling the operation of said common means.

4. In a motor control system, in combination, a motor having an armature winding, a series field winding and a shunt field winding, a source of power for the motor, switching means for connecting the motor to the power source, common means for successively shunting resistance from the motor armature circuit and inserting resistance in the shunt field circuit to accelerate the motor and for shunting resistance from the shunt field circuit to cause the motor to regenerate current, and means responsive to the motor voltage for controlling the operation of said switching means during regeneration.

5. In a motor control system, in combination, a motor having an armature winding, a series field winding and a shunt field winding, a source of power for the motor, and common means for successively shunting resistance from the motor armature circuit and inserting resistance in the shunt field circuit to accelerate the motor, said common means being operable to successively shunt resistance from the shunt field circuit and the armature circuit to produce electrical braking by said motor.

6. In a motor control system, in combination, a motor having an armature winding, a series field winding and a shunt field winding, a source of power for the motor, common means for successively shunting resistance from the motor armature circuit and inserting resistance in the shunt field circuit to accelerate the motor, said common means being operable to successively shunt resistance from the shunt field circuit and the armature circuit to produce electrical braking by said motor, and means responsive to the motor armature current for controlling the rate of operation of said common means.

7. In a motor control system, in combination, a motor having an armature winding, a series field winding and a shunt field winding, a source of power for the motor, switching means for connecting the motor to the power source, a controller for controlling the operation of said switching means, a variable resistor for controlling the motor armature current, a variable resistor for controlling the shunt field current, common means for successively decreasing and increasing said resistors to accelerate the motor and for decreasing said resistors to decelerate the motor, and means responsive to the motor armature current for controlling the rate of operation of said common means.

8. In a motor control system, in combination, a motor having an armature winding, a series field winding and a shunt field winding, a source of power for the motor, switching means for connecting the motor to the power source, a controller for controlling the operation of said switching means, a variable resistor for controlling the motor armature current, a variable resistor for controlling the shunt field current, common means for successively decreasing and increasing said resistors to accelerate the motor and for decreasing said resistors to decelerate the motor, means responsive to the motor armature current for controlling the rate of operation of said common means, and means mechanically connected to said controller for governing the operation of said current-responsive means.

9. In a motor control system, in combination, a motor having an armature winding, a series field winding and a shunt field winding, a source of power for the motor, switching means for connecting the motor to the power source, a controller for controlling the operation of said switching means, a variable resistor for controlling the motor armature current, a variable resistor for controlling the shunt field current, common means for successively decreasing and increasing said resistors to accelerate the motor and for decreasing said resistors to decelerate the motor, means responsive to the motor armature current for controlling the rate of operation of said common means, and spring means actuated by said controller to govern the operation of said current-responsive means.

10. In a motor control system, in combination, a motor having an armature winding, a series field winding and a shunt field winding, a source of power for the motor, switching means for connecting the motor to the power source, a controller for controlling the operation of said switching means, a variable resistor for controlling the motor armature current, a variable resistor for controlling the shunt field current, common means for successively decreasing and increasing said resistors to accelerate the motor and for decreasing said resistors to decelerate the motor, means responsive to the motor armature current for controlling the rate of operation of said common means, and switching means incorporated in said controller for controlling the direction of operation of said common means.

11. In a motor control system, in combination, a motor, a source of power for the motor, switching means for connecting the motor to the power source to operate the motor by supplying current thereto, variable resistance means for controlling the motor current, a controller for controlling the operation of said resistance means and said switching means, and relay means responsive to the motor current for preventing the opening of said switching means while the motor current exceeds a predetermined amount.

12. In a motor control system, in combination, a motor, a source of power for the motor, switching means for connecting the motor to the power source, a controller for controlling the operation of said switching means, means for inserting resistance in the motor circuit to decrease the motor current, means associated with said controller for controlling the operation of said resistance inserting means, and relay means responsive to the motor current for preventing the opening of said switching means while the motor current exceeds a predetermined amount.

13. In a motor control system, in combination, a motor for propelling a vehicle, a source of power for the motor, switching means for connecting the motor to the power source, resistance varying means for controlling the motor speed, and means energized in accordance with the vehicle speed for controlling the operation of said resistance varying means while the motor is disconnected from the power source during a decrease in the speed of the vehicle.

14. In a motor control system, in combination, a motor for propelling a vehicle, a source of power for the motor, switching means for connecting the motor to the power source, resistance varying means for controlling the motor speed, and relay means responsive to a decrease in the vehicle speed for controlling the operation of said resistance varying means while the motor is disconnected from the power source during coasting of the vehicle.

15. In a motor control system, in combination, a motor for propelling a vehicle, a source of power for the motor, switching means for connecting the motor to the power source, resistance varying means for controlling the motor speed, relay means responsive to a decrease in the vehicle speed for controlling the operation of said resistance varying means while the motor is disconnected from the power source during coasting of the vehicle, and means for governing the operation of said relay means.

16. In a motor control system, in combination, a motor for propelling a vehicle, a source of power for the motor, switching means for connecting the motor to the power source, resistance varying means for controlling the motor speed, relay means responsive to a decrease in the vehicle speed for controlling the operation of said resistance varying means while the motor is disconnected fom the power source during coasting of the vehicle, and means associated with said resistance varying means for governing the operation of said relay means.

17. In a control system, in combination, a motor having an armature winding, a series field winding and a shunt field winding, a source of power for the motor, a resistor for controlling the motor armature current, a resistor for controlling the shunt field current, means for successively varying said resistors to accelerate the motor and to produce regeneration and dynamic braking in sequential relation, and switching means cooperating with said resistance varying means for establishing the motor connections during electrical braking.

18. In a control system, in combination, a motor having an armature winding, a series field winding and a shunt field winding, a source of power for the motor, a resistor for controlling the motor armature current, a resistor for controlling the shunt field current, means for successively varying said resistors to accelerate the motor and to produce regeneration and dynamic braking in sequential relation, switching means cooperating with said resistance varying means for establishing the motor connections during electrical braking, and interlocking means on said switching means for governing the sequence of the braking operations.

LYNN G. RILEY.
NORMAN H. WILLBY.
FRANK B. POWERS.